Feb. 3, 1942.  E. KOMENDA  2,271,649
VEHICLE BODY CONSTRUCTION
Filed Oct. 27, 1938
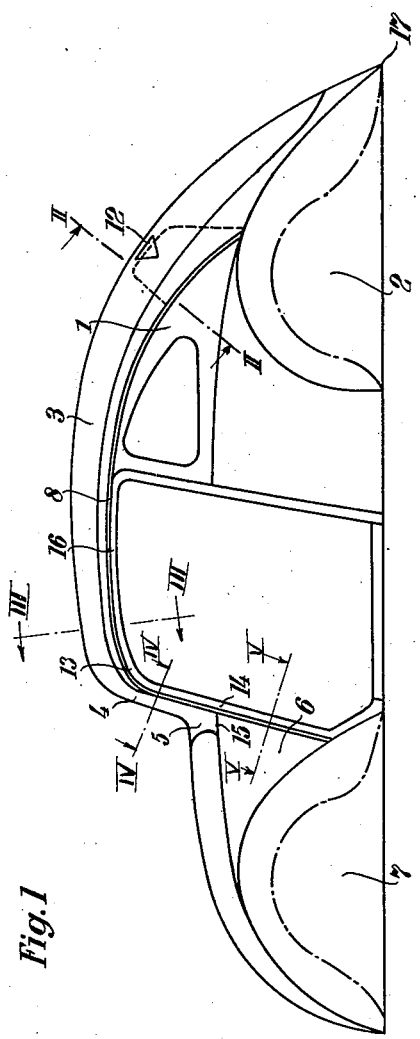
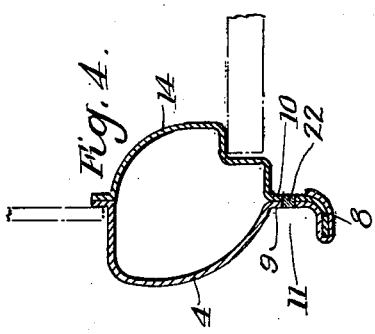
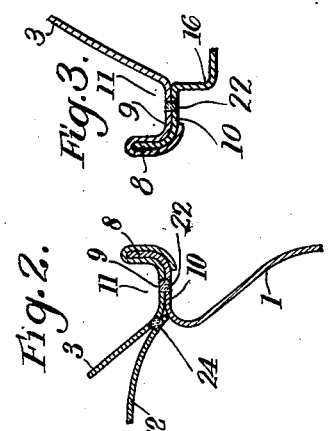
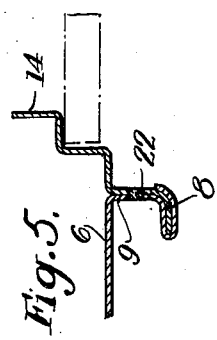
Inventor:
Erwin Komenda
by
Attorneys Patented Feb. 3, 1942

2,271,649

UNITED STATES PATENT OFFICE 2,271,649

VEHICLE BODY CONSTRUCTION

Erwin Komenda, Korntal, near Stuttgart, Germany, assignor to Dr. ing. h. c. F. Porsche, K.-G., Stuttgart-Zuffenhausen, Germany, a company of Germany Application October 27, 1938, Serial No. 237,164
In Germany October 29, 1937

3 Claims. (Cl. 296—28)

This application relates to vehicle body construction and is particularly concerned with an improved type of connection between the roof and side walls of such a vehicle body.

An object of this invention is the provision of a simple, strong and inexpensive type of connection between parts of a vehicle body.

Another object of this invention is the provision of an improved connection between the top and side walls of a vehicle body made from sheet metal.

A further object of this invention is the provision of an improved connecting means between the top and side walls of an enclosed vehicle body which, at the same time serves as a longitudinally strengthening beam.

A still further object of this invention is the provision of an improved connecting means between the top and side walls of a closed vehicle body which at the same time serves as a rain gutter for the vehicle.

Other objects and advantages of this invention will be apparent from the description of the single embodiment of this invention hereafter set forth and portrayed in the attached drawing in which:

Fig. 1 is a side view of a vehicle body formed in accordance with my invention;

Fig. 2 is a transverse cross-sectional view on an enlarged scale along the line II—II of Fig. 1, showing details of the construction there illustrated;

Fig. 3 is a transverse cross-sectional view on an enlarged scale along the line III—III of Fig. 1;

Fig. 4 is a transverse cross-sectional view on an enlarged scale along the line IV—IV of Fig. 1; and Fig. 5 is a transverse cross-sectional view on an enlarged scale along the line V—V of Fig. 1.

A preferred form of this invention, as portrayed in the accompanying drawing, shows a vehicle body having a side wall 1 in which is provided a rear wheel insert 2; a top 3 having integrally therewith a windshield frame 4 and an upper apron 5; and a lower main apron portion 6 having a front wheel insert 7 formed therein.

A novel feature of this construction is in the manner of interconnecting the top 3 with the side wall 1 and is more clearly shown in the cross-sectional view of Fig. 2. This connection is in the form of a fold generally indicated at 8 which is formed by bending the upper and lower edges respectively of the side wall 1 and the top 3. The side wall 1 is bent outwardly and then upwardly to form an upstanding flange 10. The top, on the other hand, is first bent outwardly to be adjacent to and contacting the similar portion of the flange 10 and then is extended up and over the upstanding edge of the lower flange. The flange of the top 3 has been indicated by the reference numeral 9. Preferably the flange 9 is bent about the flange 10 with some tension so as to form a tight fold.

It will be noted that the top of the connection described above forms by itself a channel 11 extending substantially the length of the vehicle top which channel will serve as a gutter for carrying away rain. If, in accordance with my preferred construction it is desired to more rigidly interconnect the flanges 9 and 10, they may be for example, spot welded as indicated at 22. If this welding is done within the channel 11, the welding burrs or spots will not be apparent from the outside of the vehicle and need not, therefore, be removed. This saving in work is extremely important. In the usual construction now used a rain gutter is separately attached to the finished vehicle, and after this attachment the parts must be finished by hand by grinding or smoothing them in order to insure a smooth appearance of the vehicle as a whole. By means of my construction I not only automatically form the rain gutter, thereby avoiding the necessity of supplementary parts and the work of attaching them, but also do away with the supplementary finishing steps.

Attention is directed to the fact that in the form of fold described above, since the upper flange extends over and about the lower flange, there is no chance that rain collectings in the gutter will seep through the two flanges and cause rusting.

In those forms of construction in which an inner transverse wall is used for giving added strength to the vehicle top such a wall may be advantageously connected with the top as I have indicated in Fig. 2. As there shown the transverse wall 12 is adapted to extend substantially to the seam between the side wall 1 and the top 3. If it is connected at this point to the top 3 by weld 24 or other suitable means, the fold 8 will act as a cover for the weld and the connection need not be ground, or otherwise finished. This will result in a further saving in the cost of the vehicle.

The type of connection which has been described serves admirably not only for interconnecting the top and the side wall proper but may also be extended to interconnect other parts of the vehicle. The fold 8 accordingly may also run all the way from the front wheel insert 7 to the rear wheel insert 2. As indicated on the drawing in Fig. 4, at the forward portion of the vehicle it may be used to interconnect the windshield frame portion 4 of the roof 3 with the windshield post 14, as well as the roof 3 with the roof rail 16 (Fig. 3). In Fig. 4 the relative position of the door and windshield is shown in dotted lines. Intermediate the windshield post 14 and the roof rail 16 is a single seam 13, and the relative displacement between the two portions of the fold 8 at this point can be brought about by a simple T-shaped connection which can, therefore, be readily closed by welding. The welding at this point may be done on the outside and need not be roughly smoothed since the weld will be usually covered by the closed door. The seam 15 between the upper and lower apron portions 5 and 6 may readily be formed to extend into the fold and will be closed by welding on the inside. The connection between the apron 6 and the windshield post 14 by the fold 8, extending downwardly at this point to the wheel insert 7 is illustrated in Fig. 5, the relative position of the door is shown in dotted lines. Attention is directed to the fact that the fold 8 serves not only as a means of interconnecting the body parts and at the same time a rain gutter, but will also form a longitudinally extending strengthening supporting beam for the vehicle. Accordingly by means of one simple operation and one simple connection a triple purpose and function is attained.

The type of connection exemplified by the fold 8 can be extended to other parts of the vehicle body. For example, the fold may, if desired, be extended all the way to the rear edge 17. Furthermore, the fold will receive other transverse vehicle parts in addition to the transverse wall 12. For example the vehicle instrument board can be formed of sheet metal and extended in such a manner that it is attached along the fold in the seam of the border by spot welding. Here again the welding spots will lie covered by the fold, and grinding, or other finishing of the connection is unnecessary.

While the invention has been particularly described with reference to a specific form of vehicle body, it is to be understood that it is equally applicable to other forms as will be apparent to those skilled in this art. It is not limited to use with a closed vehicle body but with all types in which sheet metal body parts are adapted to be connected together. Accordingly it is to be understood that my invention is not limited except in accordance with the claims which follow:

I claim:

1. In a vehicle body, a sheet metal top, a sheet metal side wall, an outwardly and upwardly extending fold formed from the lower edge of said top and the upper edge of said side wall, the upper edge of said wall being shaped as an outwardly displaced, upwardly extending flange over and around which the lower edge of said top is bent to form a channel serving as a rain gutter and longitudinal strengthening beams for said body, and a sheet metal transverse wall terminating at the inner joint between said top and side wall, and means screened on the outside by the upwardly extending portion of said fold for interconnecting the edge of said transverse wall with the edge of said top.

2. In a vehicle body, a sheet metal top, a sheet metal side wall, an outwardly and upwardly extending fold formed from the lower edge of said top and the upper edge of said side wall, the upper edge of said wall being shaped as an outwardly displaced, upwardly extending flange over and around which the lower edge of said top is bent to form a channel, and a rear wheel insert formed in said side wall, said channel serving as a rain gutter and longitudinal strengthening beam for said body and extending rearwardly and downwardly into said wheel insert.

3. In a vehicle body, a sheet metal top including an integral windshield frame, a sheet metal side wall, a sheet metal apron, a sheet metal roof rail, a sheet metal windshield post, and a continuous fold formed by the overlapping of the edges of said top, windshield frame and apron with the edges of said side wall, roof rail and windshield post, said fold serving as a rain gutter and longitudinal strengthening beam for said body.

ERWIN KOMENDA.